United States Patent

Kato et al.

[11] Patent Number: 6,089,068
[45] Date of Patent: Jul. 18, 2000

[54] METHOD OF MANUFACTURING A SHAFT HAVING A FLUID FLOW PASSAGE

[75] Inventors: Keigo Kato; Masataka Mizuno, both of Aichi, Japan

[73] Assignee: Aoyama Seisakusho Co., Ltd., Nagoya, Japan

[21] Appl. No.: 09/308,862

[22] PCT Filed: Oct. 21, 1998

[86] PCT No.: PCT/JP98/04754

§ 371 Date: May 26, 1999

§ 102(e) Date: May 26, 1999

[87] PCT Pub. No.: WO99/20416

PCT Pub. Date: Apr. 29, 1999

[30] Foreign Application Priority Data

Oct. 22, 1997 [JP] Japan ................................... 9-289577

[51] Int. Cl.[7] .................................................. B21B 13/04
[52] U.S. Cl. .................................................... 72/199
[58] Field of Search ............................ 72/199, 88, 90, 72/92, 93, 103, 104, 469, 75

[56] References Cited

U.S. PATENT DOCUMENTS

| | | | |
|---|---|---|---|
| 3,813,718 | 6/1974 | Kamiya | 72/88 |
| 4,491,002 | 1/1985 | Toropov et al. | 72/103 |
| 4,764,067 | 8/1988 | Kawashima . | |
| 4,782,681 | 11/1988 | Kawashima . | |
| 4,782,688 | 11/1988 | Kawashima . | |
| 4,866,966 | 9/1989 | Hagen | 72/75 |
| 5,269,164 | 12/1993 | Choi | 72/75 |
| 5,546,780 | 8/1996 | Lee | 72/75 |

FOREIGN PATENT DOCUMENTS

| | | |
|---|---|---|
| 63-5835 | 1/1988 | Japan . |
| 63-281732 | 11/1988 | Japan . |
| 63-281733 | 11/1988 | Japan . |

*Primary Examiner*—Rodney A. Butler
*Attorney, Agent, or Firm*—Frishauf, Holtz, Goodman, Langer & Chick, P.C.

[57] ABSTRACT

A method of manufacturing a shaft having below a surface thereof a flow passage, through which a fluid can flow, includes a preliminary step of forming in a surface of a columnar-shaped base material grooves having a substantially U-shaped cross section, and a finishing step of compressing crests of thread ridges between the adjacent thread grooves in a direction, in which the base material is reduced in diameter, to perform plastic deformation and join the deformed crests to one another to form a spiral-shaped, closed space which communicates the spaces in the thread grooves.

3 Claims, 1 Drawing Sheet

METHOD OF MANUFACTURING A SHAFT HAVING A FLUID FLOW PASSAGE

TECHNICAL FIELD

The present invention relates to a method of manufacturing a metallic shaft having a fluid flow passage immediately below a surface thereof.

BACKGROUND ART

Normally, a lubricating oil is used to smoothly rotate a rotating shaft born by slide bearings or reciprocate a columnar-shaped shaft such as sliding valve discs used in slide valves, and consideration is taken so as to provide the lubricating oil with a function of preventing seizure with a cooling effect, by which heat generated is removed, in addition to functions of reducing frictional resistance, maintaining airtightness and so on.

When the lubricating oil becomes short, such cooling capacity decreases to cause a condition of partial seizure on an associated shaft. Because such partial seizure further impedes smooth flow of the lubricating oil, the entire shaft undergoes seizure and eventually rotation or reciprocation of the shaft is made impossible.

In order to prevent such accident, an oil groove or grooves are sometimes formed on the shaft surface to avoid a shortage of an amount of a lubricating oil. However, such measures are problematic in that as an operation goes on, a foreign matter such as abrasion debris or the like generated due to friction will accumulate in such oil groove or grooves to clog a flow passage of the lubricating oil, resulting in the lubricating and cooling function being impeded.

DISCLOSURE OF INVENTION

The present invention has been achieved in order to solve the problems of the prior art, and has its object to provide a method of manufacturing a shaft having a flow passage, which is designed such that fluid flow is hard to be impeded, at low cost and with ease.

To cope with the situation, the inventors of this application have found in the course of study on a construction, in which a spiral-shaped pipe for fluid flow is arranged on a surface of a columnar-shaped shaft that a rolling method provides measures for solving the problems, and have completed the invention.

Thus the invention provides a method of manufacturing a shaft having a flow passage below a surface thereof, through which a fluid can flow, comprising a preliminary step of forming in a surface of a columnar-shaped base material thread grooves having a substantially U-shaped cross section, and a finishing step of compressing crests of thread ridges between the adjacent thread grooves in a direction, in which the base material is reduced in diameter, to perform plastic deformation of the crests and join the deformed crests to one another to form a spiral-shaped, closed space which communicates spaces in the thread grooves.

Here, the invention can be embodied in the following respective modes:

(1) A mode, in which the preliminary step comprises a first preliminary step of forming in the surface of the columnar-shaped hose material thread grooves having a substantially V-shaped cross section, and a second preliminary step, being effected subsequent to the first preliminary step, of expanding the thread grooves having the substantially V-shaped cross section to form thread grooves, of which valleys are arcuate, and which have a substantially U-shaped cross section.

(2) A mode, in which the finishing step is effected in rolling, in which the base material having been formed in a surface thereof with the thread grooves having a substantially U-shaped cross section is interposed between a movable flat-plate die and a stationary flat-plate die, and the base material is made to be pressed and rolled.

(3) A mode, in which the second preliminary step and the finishing step are effected in a series of rolling processings, in which the base material having been formed in a surface thereof with the thread groove having a substantially V-shaped cross section is interposed between a movable flat-plate die and a stationary flat-plate die and the base material for shaft is made to be pressed and rolled.

BEST MODE FOR CARRYING OUT THE INVENTION

The invention will be described in detail with reference to FIGS. 1(A)–1(D), in which an embodiment of the invention is shown.

Figure 1A:
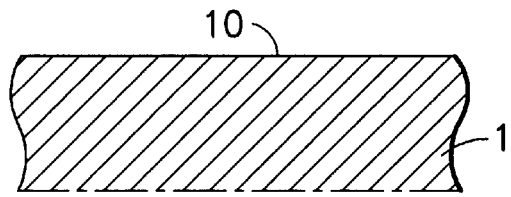
FIGS. 1(A), 1(B), 1(C) and 1(D) are views illustrating main steps in the invention.
Figure 1B:
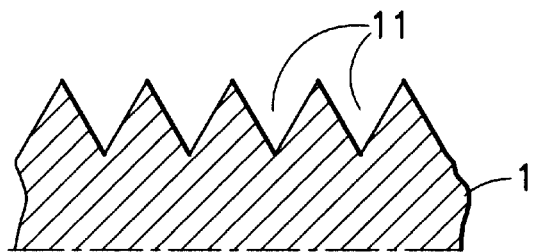
Figure 1C:
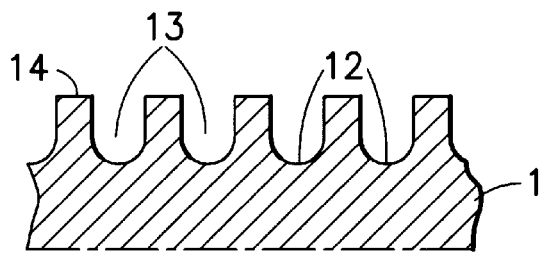
Figure 1D:
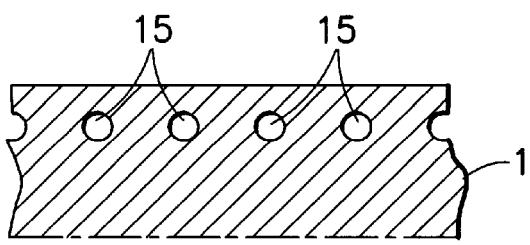

The drawing illustrates a change in configuration of a shaft surface portion in the course of main steps of the invention. FIG. 1(A) shows an upper half (shown also in the other drawings in the same manner) of a columnar-shaped base material (1) as prepared having a substantially smooth surface (10), FIG. 1(B) shows a state going through a first preliminary step, in which thread grooves (11) having a substantially V-shaped cross section are formed in a surface of the base material by optional measures such as rolling method or the like. FIG. 1(C) shows a state going through a second preliminary step, which is subsequent to the first preliminary step, and in which the thread grooves (11) having the substantially V-shaped cross section and formed in the first preliminary step are expanded to be formed into thread grooves (13) having a substantially U-shaped cross section, of which roots (12) are arcuate. And FIG. 1(D) shows a state going through a finishing step, which is subsequent to the second preliminary step, and in which crests (14) of thread ridges between the adjacent thread grooves (13) having the substantially U-shaped cross section are compressed in a direction, in which the base material is reduced in diameter, to be plastically deformed, and the adjacent crests subjected to plastic deformation are joined to one another to form a spiral-shaped flow passage (15) communicating from one end of the base material to the other end thereof to enable a fluid flowing therethrough while the roots (12) of the thread groove beforehand formed and having the substantially U-shaped cross section are retained immediately below the surface of the base material.

As described above, the invention enables first forming in the surface of the columnar-shaped base material (1) the thread grooves (13) having the substantially U-shaped cross section, and then forming very easily the spiral-shaped flow passage (15) communicating from one end of the base material to the other end thereof, below the surface of the columnar-shaped base material only by compressing the crests (14) of the thread ridges between the adjacent thread grooves in a direction, in which the base material is reduced in diameter, to apply plastic deformation on the same.

In addition, it is important in the invention that a depth of the thread grooves (13) beforehand formed in the preliminary step be sufficient to be formed into the spiral-shaped flow passage (15), which is formed in the next finishing step to permit a fluid to flow therethrough. Also, a pitch of the thread grooves is important in forming a desired flow passage. This is because thread ridges between the adjacent thread grooves are subjected to plastic deformation to make the thread grooves the flow passage, of which surface is closed, as described hereinafter.

Although it has been described heretofore that the preliminary step, in which the thread grooves having the substantially U-shaped cross section are formed, is effected in two stages including the first preliminary step (the cross sectional shape of the formed thread grooves is V-shaped) and the second preliminary step (the cross sectional shape of the formed thread grooves is U-shaped), the thread grooves may be formed in a single step to have a desired U-shaped cross section provided that conditions such as a material of the base material (1), various dimensions (width, depth, pitch and the like) of the thread grooves, size of an intended flow passage and the like are met.

Further, the spiral-shaped flow passage communicating from one end of the base material to the other end thereof can be formed simply and efficiently in the finishing step by interposing the base material, which has been formed with the thread grooves (13) having the U-shaped cross section in the preceding step, between a movable flat-plate die and a stationary flat-plate die, both of which face each other in parallel to an axis of the base material so as to compress the crests (14) of the thread ridges, and using a rolling method, in which the movable flat-plate die is moved in a direction orthogonal to the axis of the base material to thereby press and roll the base material, to subject the crests to plastic deformation to bring the deformed adjacent crests into pressure contact with one another and join them together, thus permitting spaces in the thread grooves to be left below the base material surface as closed spaces, through which the fluid can flow.

Accordingly, the invention can be practiced in a substantially one step by effecting the first preliminary step to the finishing step with a rolling method. Also, in the case where a base material having gone through the first preliminary step is available, only the second preliminary step and the finishing step can be effected in a substantially one step.

Incidentally, it was confirmed that the flow passage with its surface closed was formed below the base material surface in an example, in which a shaft having below its surface a spiral-shaped flow passage capable of flowing therethrough a fluid was manufactured in the following condition:

(1) Base material prepared: a hexagon bolt (nominal size: M12, nominal length: 20 mm, pitch: 1.75 mm, effective diameter: 10.7 mm, material: equivalent to SWRCH6R: 40 to 50 kgf/cm$^2$ of tensile strength)

(2) Movable die (length: 370 mm, thickness: 32 mm, material: SKD11, hardness: HrC=59 to 61, surface: honing)

(3) Stationary die (length: 350 mm, thickness: 32 mm, material: SKD11, hardness: HrC=59 to 61, surface: honing)

In addition, a processing step included the second preliminary step and the finishing step (effected in a single step) since a bolt put on the market was used as the base material. Here, the rolling was effected twice (change in outside dimension of bolt: 11.9 mm 11.2 mm 10.8 mm. In addition, the thread grooves were formed to be slit-shaped in one time, and were not made a flow passage.)

INDUSTRIAL APPLICABILITY

As described above, according to the invention, a shaft of new construction having a flow passage capable of flowing therethrough a cooling or heating fluid can be simply and efficiently manufactured only by forming thread grooves in a metallic base material having a columnar shape in a known method, and then applying a rolling method to cause spaces in the thread groove to be plastically deformed into a spiral-shaped flow passage which communicates from one end of the base material to the other end thereof.

Accordingly, the invention is of exceedingly good industrial value as a method of manufacturing a shaft with a flow passage, through which a fluid can flow, the shaft enabling development of new use.

What is claimed is:

1. A method of manufacturing a shaft having a fluid flow passage below a surface thereof, comprising:

a first preliminary step of forming in a surface of a columnar-shaped base material thread grooves having a substantially V-shaped cross section, a second preliminary step, which is effected subsequent to the first preliminary step, of expanding the thread grooves having the substantially V-shaped cross section to form thread grooves having a substantially U-shaped cross section and whose roots are arcuate, and a finishing step of compressing crests of thread ridges between adjacent ones of the thread grooves in a direction in which the base material is reduced in diameter, to perform plastic deformation of the crests and join the deformed crests to one another to form a spiral-shaped closed space which communicates spaces in the thread grooves.

2. The method according to claim 1, wherein said finishing step is effected by rolling, in which the base material having the grooves with the substantially U-shaped cross section formed in the surface thereof is interposed between a movable flat-plate die and a stationary flat-plate die and then pressed and rolled.

3. The method according to claim 1, wherein said second preliminary step and said finishing step are effected in a series of rolling processings, in which the base material having the grooves with the substantially V-shaped cross section formed in the surface thereof is interposed between a movable flat-plate die and a stationary flat-plate die and then pressed and rolled.

* * * * *